United States Patent

[11] 3,629,852

| [72] | Inventors | Melvin W. Thexton<br>La Palma, Calif.;<br>Stanley R. Schaub, Brussels, Belgium |
|---|---|---|
| [21] | Appl. No. | 807,162 |
| [22] | Filed | Feb. 13, 1969 |
| [45] | Patented | Dec. 21, 1971 |
| [73] | Assignee | Pioneer Magnetics, Inc. |

[54] TRANSIENT ANALYZER
21 Claims, 10 Drawing Figs.

[52] U.S. Cl. .................................................. 340/172.5,
324/102
[51] Int. Cl. ........................................................ G01r 27/28
[50] Field of Search .......................................... 324/102,
114, 77; 340/172.5

[56] References Cited
UNITED STATES PATENTS

| 2,954,522 | 9/1960 | Dickey et al. | 324/102 |
| 2,970,260 | 1/1961 | Flint | 324/114 |
| 3,431,492 | 3/1969 | James et al. | 324/102 |
| 3,437,927 | 4/1969 | Cornwell, Jr. et al. | 324/102 |
| 3,484,689 | 12/1969 | Kerns | 324/102 |
| 3,505,598 | 4/1970 | Merrill | 324/102 |

Primary Examiner—Raulfe B. Zache
Assistant Examiner—Mark Edward Nusbaum
Attorneys—Golove and Kleinberg, Leonard Golove and Marvin H. Kleinberg ABSTRACT: Transient phenomena in a system are monitored, analyzed, and stored by apparatus which converts significant characteristics of transient phenomena as they occur, into quantified, electrical signals. The significant characteristics include positive and negative peaks, duration of positive and negative transient, and the rate of "rise" of positive and negative transients. The quantified data can be applied in real time to a display apparatus to provide a chronological record of each of the characteristics, or can be stored in a relatively low-bandwidth memory system for subsequent playback into display apparatus.

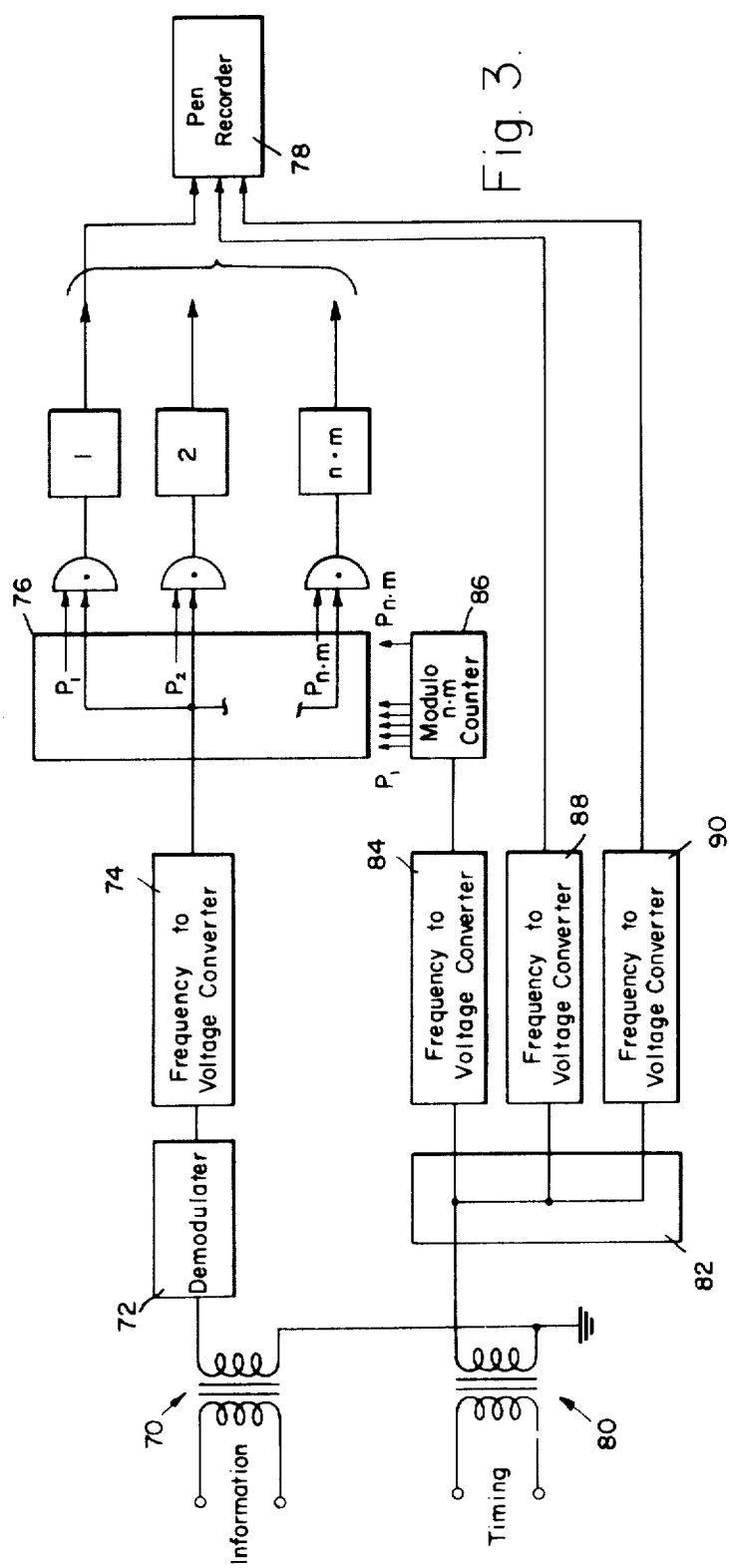
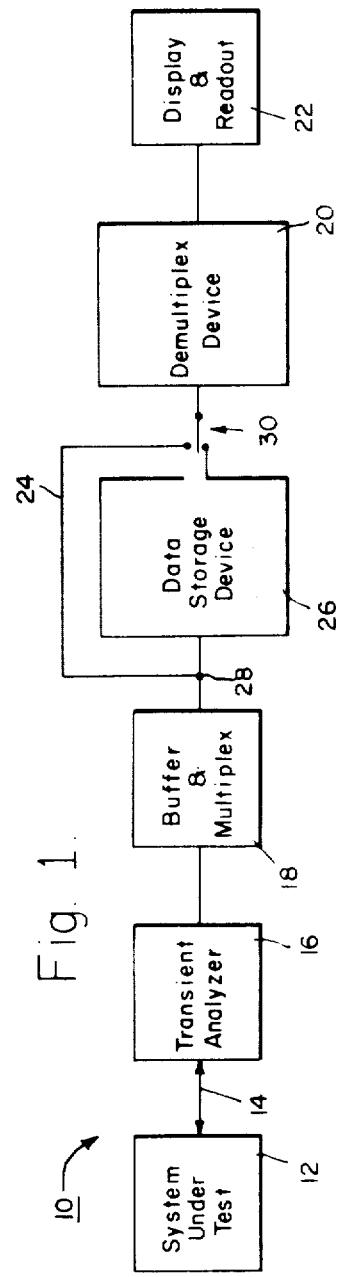
Fig. 3.
Fig. 1.
Stanley R. Schaub,
Melvin W. Thexton,
INVENTORS.
BY.
GOLOVE & KLEINBERG,
ATTORNEYS.

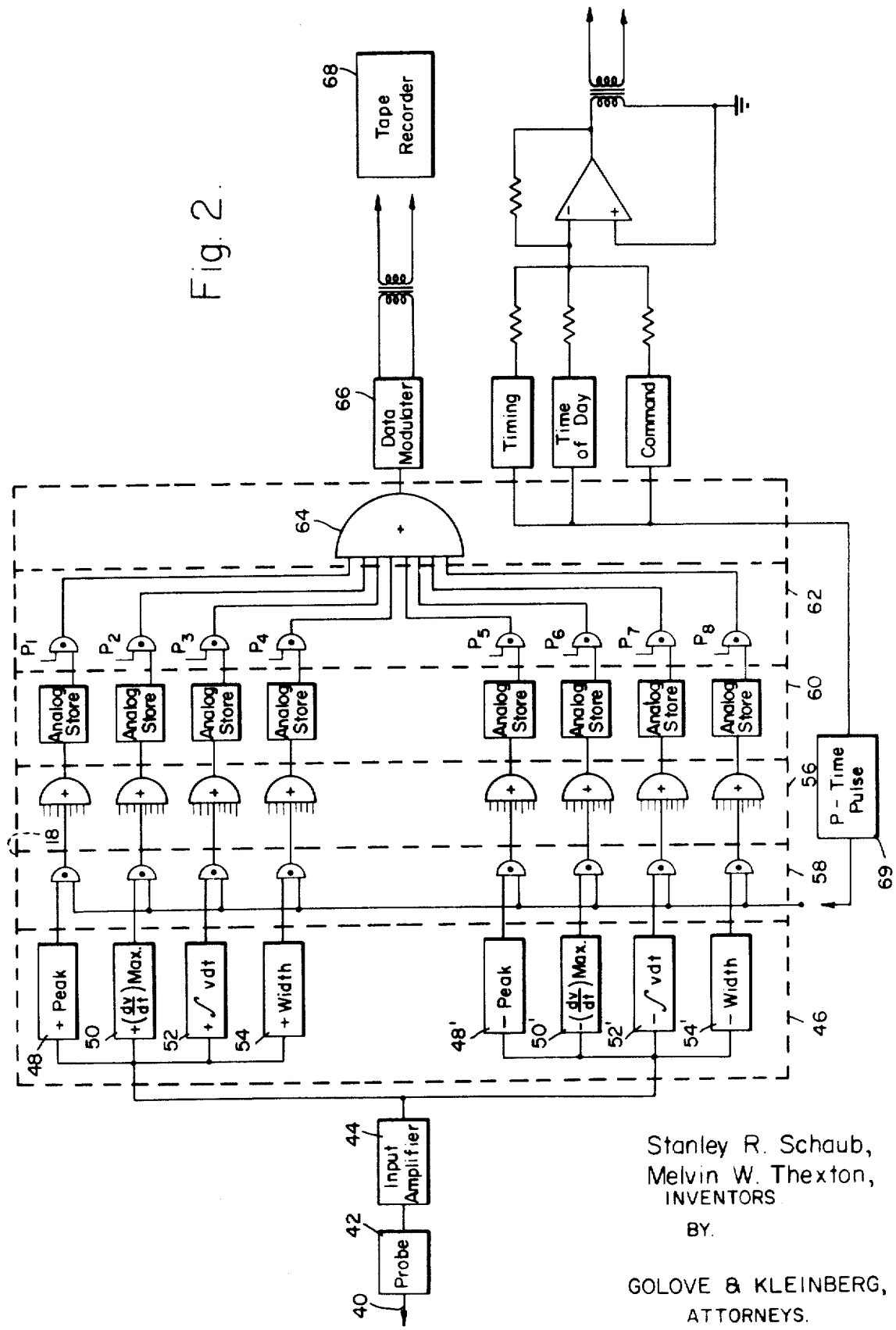

Stanley R. Schaub,
Melvin W. Thexton,
INVENTORS.

BY.

GOLOVE & KLEINBERG,
ATTORNEYS.

TRANSIENT ANALYZER

The present invention relates to monitoring systems and more particularly to a system that is adapted to detect and record the occurrence of transient phenomena, as well as certain, predetermined parameters of transients, as they occur.

Prior art systems have attempted, by "brute force" techniques, to record and reproduce transient phenomena in electrical systems. Since, by its very nature, a "transient" can occur at any time, can be of any magnitude, polarity duration, rise time and energy content, the problem has proved to be overwhelming. Further, transients, which may be harmless in one portion of a system, may be catastrophic in another portion of the system, and, accordingly, it is frequently necessary to monitor several test points throughout the system.

For high-speed transients, conventional recording devices such as oscillographs or plotters are too "slow" and have too much "inertia." As a result, such devices are virtually insensitive to transients of brief duration and are inadequate. For low-speed transients, magnetic recorders and oscilloscopes (with a motion picture capability for a permanent record) are "faster" than necessary. These devices must be "replayed" to determine if a transient has occurred and, if so, the characteristics of the transient. This determination requires extensive review of a record that, for the most part, is substantially without information of interest.

To use the high-speed recording devices for high-speed transients is an inefficient alternative since an extensive record must be reviewed. In the absence of a better method, they must be employed if high-speed transient phenomena are to be captured for subsequent analysis. Therefore, conventional methods are, at best, expensive, and, at worst, inadequate to collect and reproduce the necessary and desirable information.

If a continuous record is to be maintained, then it is preferable to have a storage medium that can be economically utilized. High-speed transients, if directly recorded on magnetic tape, required high resolution, wide band width magnetic circuits and high-speed tape transports. A substantial amount of tape is "consumed" if the system must be monitored for any extended period of time. Further, if a high-speed transport has been used, almost as much time is required to "play back" the record, as was required to make the record in the first instance. Generally, there is no way of knowing that a transient has occurred until the record is played back. If an oscillograph is used to provide a visible record for subsequent analysis, the playback should be at a much *slower speed*, so that the slower response characteristics of the oscillograph do not degrade the record.

As a result, detailed knowledge of the significant features of a transient, which may have had a catastrophic effect upon a system, may not come until hours or days after the fact. Typically, a 5,000 foot reel of magnetic tape can record some 16 minutes of operation at a linear speed of 60 i.p.s. however, some 8½ hours of playback is required to enable the use of a 5 kHz. oscillograph to make the permanent record for detailed analysis. Motion picture cameras, in conjunction with oscilloscopes, can permit higher speed playbacks, but the developing step can be a time-consuming one and the limitations of film sensitivity and camera speed are serious ones.

It is clear that direct writing techniques are useful only with relatively slow transients of substantial duration. Even then, it is difficult, if not impossible to ascertain the "high speed" characteristics of the transient, such as "rise time." Further, these techniques require an expensive recording device for each test point. Direct writers do offer the advantages of "high-speed" review, since the record is, at all times, visible.

Other electronic devices have also been used to detect and store transients. Typical devices include "pulse stretchers" or transient amplitude voltmeters. In these electronic "staticizers," a capacitor is "charged" by a transient and, if the time constants of the circuit are suitable, the capacitor holds the charge until it can be "read out" to a display, such as a oscillograph, or digital voltmeter. "Go, no-go" displays may also "detect" transients. If a transient characteristics exceeds a predetermined threshold value set for that characteristic, an alarm type signal is triggered. However, once the alarm is given, subsequent transients exceeding the threshold may go undetected unless provision is made for resetting. Such systems are in common use to protect equipment with respect to certain characteristics, the most common example of which is the current-limiting fuse.

Recent investigations by the inventors have led to the conclusion that, of the many parameters and characteristics of a transient phenomenon, whether in an AC system or a DC system, the parameters or characteristics most likely to provide meaningful information for subsequent review and analysis are, among others; peak amplitude of the transient; duration of the transient; rate of rise of the leading "edge"; and, in some instances, the energy content of the transient, which, hereinafter, will be referred to generally, as the "significant characteristics."

What is needed and what is provided, according to the present invention, is a combination that can monitor a plurality of test points of a system for the significant characteristics of the transients that occur, quantify these significant characteristics, and multiplex the signals that correspond to and are representative of the significant characteristics derived at the several test points, into a single serial record. A significant characteristic from one of the test points may also be simultaneously supplied to a graphic recorder to provide a "real time" display record, , as an aid or index for the playback of the record.

By employing a data reduction step at the instant of data acquisition, virtually all "wide bandwidth" requirements can be dispensed with in the other elements of the combination and low-quality communication channels can be employed. The initial data reduction step only requires circuits having extremely fast response times. The record, however, need only respond to the quantified data, and therefore, may be of a narrow band width or "low quality." The system can easily include Go, No-Go indicators, controlled directly by the data reduction circuits.

Selection of the appropriate parameters of a transient to be monitored in any given system entails an analysis of that system and the vulnerability of the system to the effects of the different characteristics. Several governmental publications have prescribed acceptable limits for certain kinds of transient phenomena. For example, MIL–STD 704A, MIL–STD 826A, MIL–E–6051C and MIL–I–618, deal with the permissable transients, surges and "spikes" superimposed on AC or DC power lines or other critical circuitry; voltage drift on power lines about a steady state DC value, or peak voltage drift, if AC; the "ripple" envelope on DC power lines; narrow and/or broadband interference envelopes superimposed on DC power lines; and the frequency drift and rate of drift in AC systems. These too, can be considered "significant characteristics."

In a preferred embodiment of the invention, a single test point of a circuit is monitored for a least three of the many significant characteristics of transient phenomena. The selected characteristics are the positive and negative amplitude maximums of each transient, the duration of the positive and negative portions of each transient; and the rate of "rise" of the positive and negative leading "edges" of each transient impulse. These characteristics are each quantified in a separate, real time, "characteristic"-to-voltage converter. A scanning interval, whose duration is correlated to the multiplexing frequency, is short enough to permit successive transients to be distinguishable, but long enough to acquire the necessary data for each transient. A "frame" or cycle time of 64 msec. has been found to be satisfactory. If more than one transient occurs during the frame, it is clear that the danger to the system is lessened. Therefore, the information is less critical.

At the end of each cycle or frame, the contents of each converter are transferred to a buffer storage device and the converters are cleared to ready them for the next frame. During a single frame, the contents of each of the buffer storage devices are sequentially multiplexed into a serial signal train which is transmitted, either through a wire or a wireless link to a magnetic recorder device, However, a "real time" recording capability exists, bypassing the magnetic recorder. For convenience, voltage signals representing the characteristics may be converted to a frequency to enable the use of frequency modulation techniques for data transmission and recordation.

On playback, the information is demultiplexed and demodulated. Each of the significant characteristics can be recorded in an individual graphic record. One playback of the stored information can be made into several instruments, or, if equipment costs are important, several playbacks can be made into a single instrument, successively.

Once the record is created, it may be played back at higher speeds without a degradation of the data, since it is unnecessary to reconstruct the transients themselves. The magnitudes of the significant characteristics can provide the information required for analysis. Further, if several graphic display devices are not available, a single recorder can display a different characteristic on each playback of the record. It may be sufficient to provide a graphic record of less than all of the characteristics from all of the test points.

By trading "time" for "hardware," a representative system that monitors each of eight test points for eight significant characteristics could, through multiplexing techniques, record all pertinent data in real time. On playback, one graphic recorder could display, in a permanent record, all of the recorded information in 64 "passes" or, 64 recorders could provide the same output in one pass.

A lesser number of recorders would require a correspondingly greater number of passes. However, even in the worst case, each playback can be accomplished in less than "real" time if a suitable one of the characteristics from each test point is used as an editing guide, or, if the record is analyzed and the "time" at which each event occurs is noted. In such cases, the playback can be at a very high speed, except for that portion of the record during which transients occurred.

In alternative embodiments, the quantification step could include a digitizing step, in which case the buffer storage, multiplexer, and recorders would employ digital-type rather than analog-type circuits. On playback, the digital data can be recovered directly or could be converted, through the use of conventional methods to a suitable analog-type record.

The type of quantification of the significant characteristics is a matter of design choice. According to the present invention, the transient is monitored by sensitive, high-speed quantifying circuits which provide signals representative of and corresponding to the important characteristics. Economic considerations would dictate that the quantifying circuits need only be sensitive enough to analyze those transients that pose a danger to the system being monitored although greater sensitivity can permit a more through analysis.

The novel features which are believed to be characteristic of the invention, both as to organization and method of operation together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is an overall block diagram of a system including a transient monitoring and analyzing apparatus according to the present invention;

FIG. 2 is a block diagram in greater detail of the analyzer of the present invention as applied to one test terminal of a system being monitored;

FIG. 3 is a block diagram of a receiving portion of a system including the demultiplexing, display and readout elements suitable for use in the system of FIG. 1;

Figures 4A, 7:
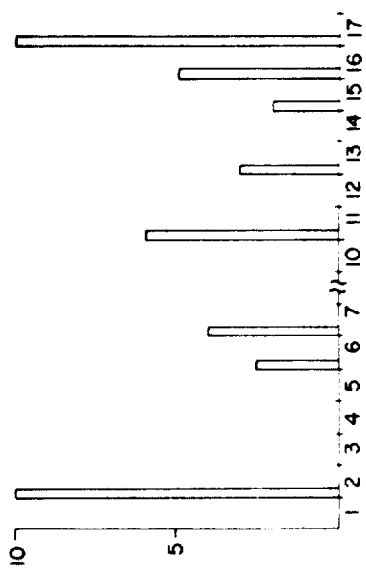
Figure 4B:
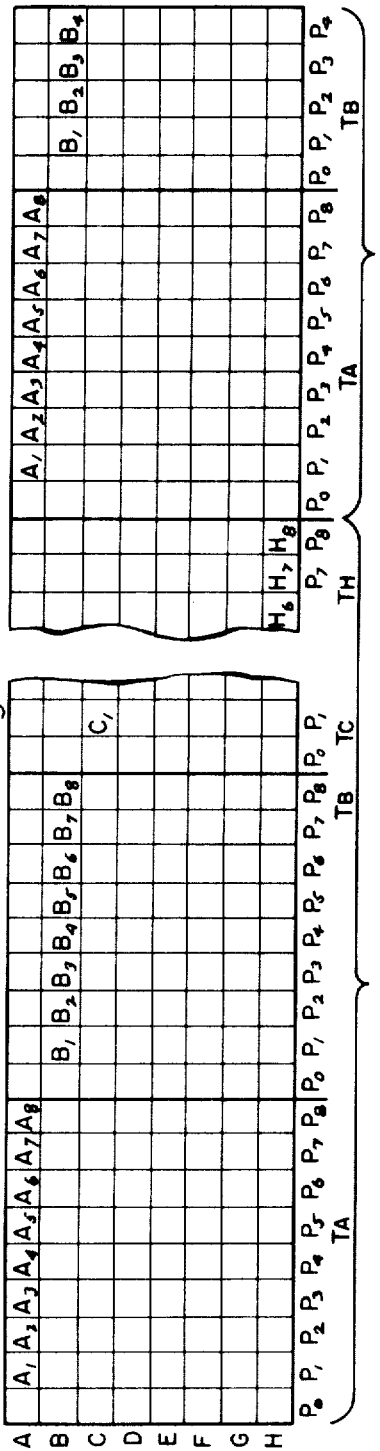
Figure 5C:
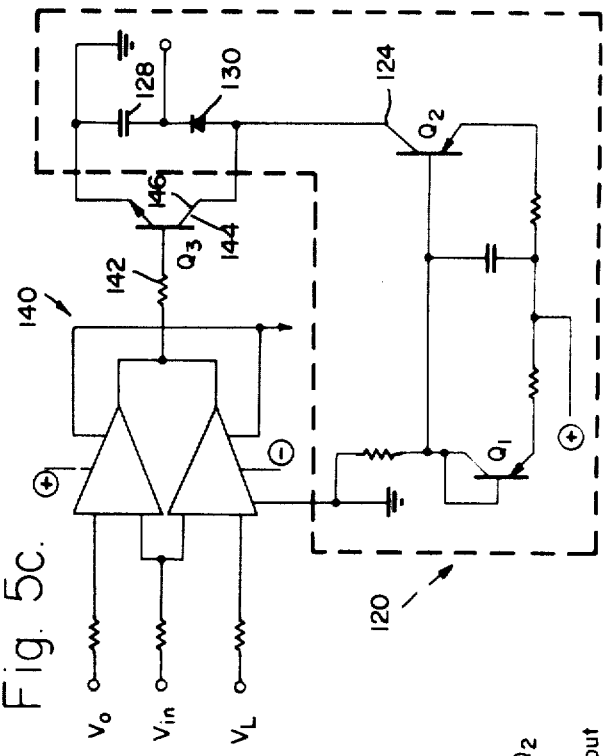
Figure 5B:
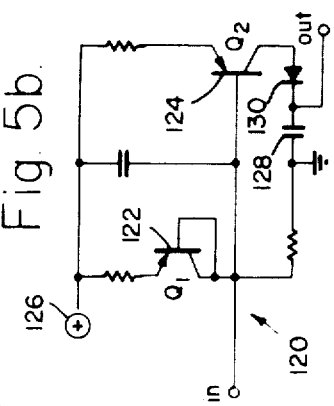
Figure 5A:
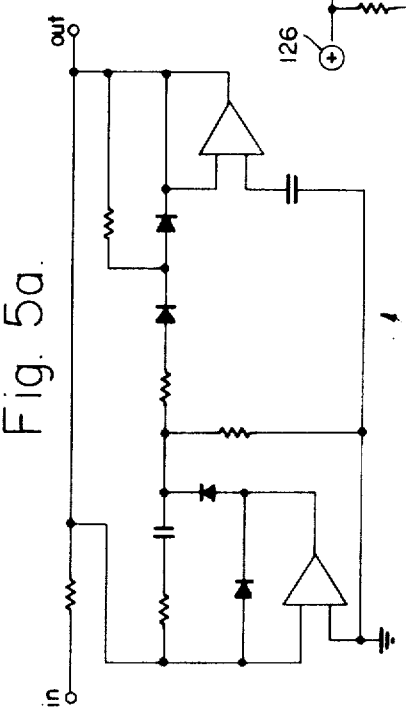
Figure 6:
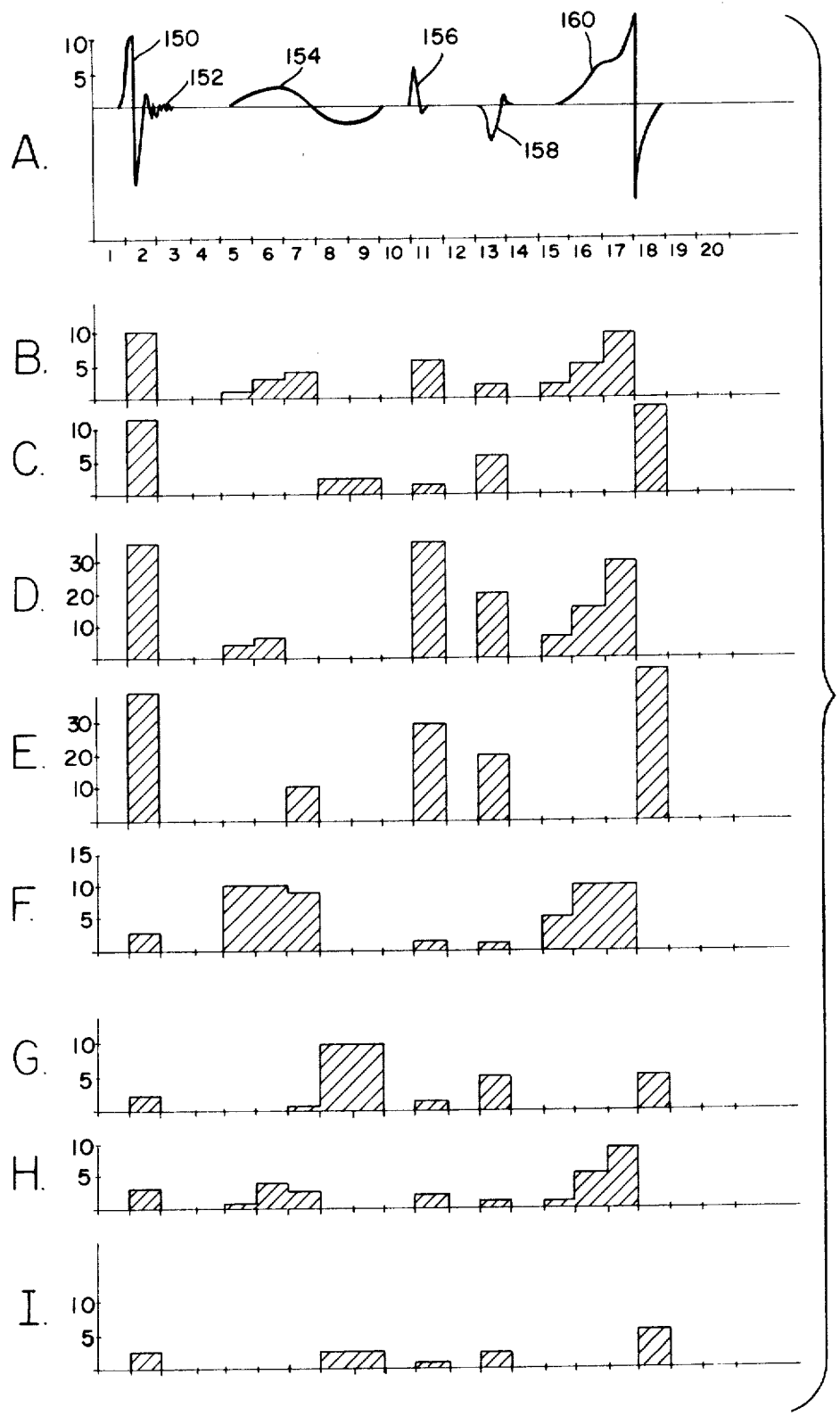

FIG. 4, including FIGS. 4a, and 4b, is a graphic representation of the time skew resulting from the serial scanning of the various quantifiers at each of the test points;

FIG. 5, including FIGS. 5a, 5b, and 5c, are schematic block diagrams of commercially available circuits for quantifying the various transient characteristics;

FIG. 6, including FIGS. 6a, through 6i inclusive, is a series of graphs, drawn to the same time base, each corresponding to a different characteristic of the transient phenomena illustrated in FIG. 6a; and FIG. 7, is a typical graphic output recording of one of the significant characteristics of the transients illustrated in FIG. 6a, above.

Turning first to FIG. 1, there is shown in block diagrammatic form, a system 10 for monitoring and analyzing, transient phenomena and for ultimately displaying the results of such analysis. Shown, as parts of the system 10, is the particular specimen system under test 12, which is connected through a cable 14 of a transient analyzer 16. The output of the transient analyzer 16 is applied to a buffer/multiplexer 18. Alternatively, the transient analyzer 16, and buffer/multiplexer 18 could be considered a single, integral unit, but for ease in explanation, two blocks have been shown.

The output of the buffer/multiplexer 18 is ultimately applied to a demultiplexer 20, and into a display and readout device 22. The display and readout device 22 may be, for example, a pen or oscillographic recorder.

The acquired data can be applied, in real time, through a direct link 24 to the demultiplexer device 20, or can be applied to a data storage device 26, for subsequent playback which may be at a more convenient time, or at a different rate of speed, compatible with the display and readout device 22. The data storage device 26 may be, for example, a tape recorder, capable of storing the data output of the buffer/multiplexer 18.

To enable the choice as between a real time or stored data output, a first terminal 28 connects the output of the buffer/multiplexer 18 to the real time link 24 and to the data storage device 26. On the output, a switch 30 permits the demultiplex device 20 to be connected either to the real time link 24 or to the data storage device 26.

In operation, the system under test 12, is permitted to operate, and, as transient phenomena occur, they are detected and examined for certain significant characteristics, which are quantified in the transient analyzer 16. The quantified special characteristics are then applied to the buffer/multiplex unit 18. The information is transmitted over the real time link 24, through the switch 30 to the demultiplexing device 20, which applies, on a plurality of channels, the quantified characteristic data to a corresponding number of display and readout elements of the display and readout device 22. A plurality of receiving terminals can be provided although only one is shown. The multiplexed information from the buffer/multiplex unit 18 can be provided although only one is shown. The multiplexed information from the buffer/multiplex unit 18 can also be applied to the data storage device 26 which may be a tape recorder, for recordation and, at a later time the information can be played back to the demultiplex, device 20 and into the display and readout device 22.

In alternative embodiments, it may be desirable to record, in real time, only a limited portion of the information acquired from the system under test 12, while, at the same time, the remainder of the information is stored in the data storage device 26. In such a case, the switch 30, is connected only to the real time link 24, so that a record can be made which can be used for editorial purposes during subsequent playbacks of the data storage device 26.

In FIG. 2, there is shown in somewhat greater detail a typical "$m$"th one of "$n$" possible "channels" of information. That is, each of the "$n$" channels would correspond to a different test point of the system 12 under investigation in a typical system having eight test points, ($n=8$). As shown in FIG. 2, the $m$th test point 40 has connected to it, a signal probe 42 which is connected to an input amplifier 44, permitting the fan out of the acquired signal to a plurality of quantifiers 46.

Each of the quantifiers 46 of the *mth* channel might be termed a "significant characteristic-to-voltage transducer" which is generally an analog-to-analog conversion device. As shown in FIG. 2, some eight quantifiers are used to provide signals corresponding to and representative of quantified transient significant characteristics.

The significant characteristics are properly divided into two similar groups of four quantifiers. One group responds to relatively positive transients and the other group responds to relatively negative transients. As shown, a first pair of quantifiers 48, 48' responds to the maximum amplitude of the transient to produce a signal, corresponding in the preferred embodiment, to the maximum positive and negative voltage excursions of the transient, respectively. A second pair of quantifiers 50, 50', provides the rate of rise or $dv/dt$ of the leading edge of the positive and negative transients, respectively. A third pair of quantifiers, 52, 52' signals, respectively, the integral, $vdt$ of the positive and negative transient, indicating the energy content of the transient. A fourth pair of quantifiers 54, 54' provides, respectively, signals representative of the width or time duration of the positive and negative transient pulses.

In the preferred embodiment, each of the quantifiers 46 is a "quantity-to-voltage" conversion device. Whenever a transient occurs, the appropriate quantifiers provide output voltage signals corresponding to and representative of the significant characteristics.

As shown in FIG. 2, each quantifier 46 is respectively connected to an individual one of a plurality of transfer gates 56 which synchronously apply the contents of the quantifiers to the storage device of the buffer/multiplexer.

In the preferred embodiment, as illustrated in FIG. 2, the buffer/multiplexer 18 is time shared among each of the "n" channels and therefore requires only the same number of storage devices as there are characteristic-to-voltage converters 46. As shown, eight characteristics are being monitored and therefore, eight elements are provided in the buffer/multiplexer 18.

Examining the buffer/multiplexer 18 in greater detail, it is seen that eight, "n"-input analog "or"-gates 56 are provided, each of which is connected to receive the signal representing the same significant characteristic, from each of the "n" channels. The particular channel whose contents are transferred is selected through the use of an input transfer gate 58, which is selectively enabled during the appropriate data transfer interval.

The outputs of the analog "or"-gates 56 are respectively applied to a corresponding plurality of analog storage devices 60, the individual outputs of which are applied, respectively, to a plurality of output transfer gates 62, which are sequentially energized by appropriate timing pulses. The outputs of the several output transfer gates 62 are commonly applied to an eight-input, analog "or"-circuit 64, the output of which is applied to a data modulator 66, that converts the signals, representative of the significant characteristics, to a corresponding frequency modulation of an AC carrier signal that is applied to the data storage device 26, which, in the preferred embodiment, is a tape recorder 68. A suitable voltage-frequency conversion circuit is described, for example at P. 162 of the Fairchild Handbook, infra and other circuits are well known in the art. A suitable data modulator can be found in the "Electronic Designer's Handbook" by Robert W. Landee, Donovan C. Davis, and Albert P. Albrecht, published in 1969 by Mc-Graw-Hill. Several alternative circuits are disclosed in Section 5 for impressing upon a signal, suitable for recordation, other signals such as digital signals, which are not ideally suited for such recordation.

A control and timing circuit 69 is provided to generate the appropriate transfer pulses, multiplexing pulses and a "real-time" code, which is appropriately modulated on a second AC carrier signal and recorded in a separate track or channel of the tape recorder 68. The recordation of the time representing code enables an accurate reconstruction, with respect to the time of occurrence, of the transient information on playback. In alternative embodiments, the time code can be multiplexed into the single information channel.

A suitable timing circuit 69 could be constructed, based, for example, upon the teachings set forth in Millman and Taub, "Pulse and Digital Circuits," published in 1956 by McGraw-Hill. With specific reference to chapters 11 and 16, there are shown various circuits for measuring time, and at page 509, FIGS. 16-25, a precision high-frequency oscillator is shown which provides an output to a divider circuit.

Based upon the information disclosed in this book, one could, without the exercise of invention, construct a control and timing circuit suitable for use in the preferred embodiment of the present invention. Since a single buffer/multiplexer 18 is time shared among all of the "n" test points, there is a time "skewing" that occurs, as among the several test points. Therefore, a transient, which would be detected at one test point in a first "frame," might be recorded, from a different test point, in an "earlier" frame. For example, if the transient occurred immediately after the first test point has been "sampled" but before the other test points have been sampled, the other test points would detect and analyze the transient in the current frame, while the first test point would record the data in the "next" frame. However, if an independent time record is made, time integrity can be maintained.

Turning next to FIG. 3, the play back and readout portion of the system of FIG. 1 is illustrated in somewhat greater detail. The data channel applies its information representing signals through an appropriate transformer 70 to a demodulator 72 which applies the frequency that corresponds to the stored information to a frequency-to-voltage converter 74. The demodulator 72 could be constructed according to the teachings either of the "Electronic Designer's Handbook," supra, or the "Radio Engineer's Handbook" by Terman, published in 1943 by McGraw-Hill. Terman, from pages 578-588, discusses frequency modulation and frequency demodulation and teaches circuits for accomplishing this method of information transmission. The voltage signals, thus recovered, are applied to a demultiplexing circuit 76 which enables the separation of the multiplexed "n.m" data signals to be recovered into a plurality of time sequenced signal trains, each corresponding to the same significant characteristic of the same test point. The serial signal train, demultiplexed, is applied to an appropriate display device, in the preferred embodiment, a pen recorder 78.

The timing channel is received by a second circuit which includes a second transformer 80 which applies the timing channel signals to a demodulator 82 and a plurality of demodulators 84, 88, 90. From a first, timing frequency to voltage converter 84, a mod $n\ m$ counter 86 is connected to supply appropriate timing pulses to the demultiplexer 76. The details of the modulo $n\ m$ counter 86 can also be found in Millman and Taub, supra, since all that is required would be a series of bistable multivibrators interconnected with appropriate feedback circuits so that the system resets on any desired count. A second converter 88 applies "time of day" signals to the pen recorder 78. Start and stop commands or special mark signals are derived from a third converter 90.

Should the time scale be changed, as for example, by slowing the tape on playback to enable the use of relatively slow response graphic devices, or speeding up the graphic record, the timing marks and time of day signals would be necessary for synchronization and for later correlation of the outputs of the various test points. However, normally, the tape need not be slowed since the system has been designed to accommodate even the slowest of the graphic recorders.

FIG. 4a illustrates, in an idealized form, the time skew resulting from the time sharing of a buffer/multiplexer among several test points, the test points being identified by alphabetic characters, "A" through "H." Each "frame" is divided into eight intervals, corresponding to the eight test points, Data collection, indicated by the letter "I" for "Input,"

proceeds for substantially the eight intervals, and the data is transferred to the time shared storage device in the interval marked "O" for "Output." It will be understood, however, that, in the preferred embodiment, the data transfer is instituted during only a portion of the "O" interval, the quantifier is then cleared and data collection for the next, subsequent frame, continues throughout the remainder of that interval and the remainder of the frame. It is understood, of course, that each interval of the frame is further divided into subintervals, during which the several significant characteristics collected at the test point, are individually recorded in the storage device. FIG. 4b shows in greater detail, the timing within a frame.

For the purposes of the present example, it is assumed that one complete subinterval is required for the transfer of data from the quantifier to the storage device and, accordingly, time pulses $P_o$-$P_8$, inclusive clock the information transfer at $P_o$, which also clears the quantifier, and time pulses $P_1$-$P_8$ clock the individual storage elements in whatever predetermined sequence has been arranged. As embodied in FIG. 2, the significant characteristics of relatively positive transients are recorded first.

To appreciate the times involved, with a frame time set at approximately 16 ms., each subinterval is some 0.22 ms., and each interval is 2.0 ms.

Turning next to FIG. 5, there are shown typical "characteristic-to-voltage" converters or quantifiers which are suitable for use in the analyzer of FIG. 2. FIG. 5 which includes FIGS. 5a through 5c, inclusive, illustrates converters for peak amplitude [FIG. 5a], duration of the transient [FIG. 5b] and rate of rise [FIG. 5c].

Turning first to FIG. 5a, there is shown a quantifier 110' for providing a voltage output corresponding to and representative of the maximum, relatively negative, excursion of a transient phenomena. The circuit is taken from FIG. 3.74 at pages 98 and 99 of the publication entitled, "APPLICATIONS MANUAL FOR COMPUTING AMPLIFIERS FOR MODELLING, MEASURING, MANIPULATING, AND MUCH ELSE" of PHILBRICK RESEARCHES, INC., which was published in 1966 and which bears the Library of Congress Catalogue No. 66-19610. The Circuit has been described as a "Precision Peak-Reader/Memory" in Paragraph III.74 of that publication. The published description also teaches how the circuit can be modified to provide an output signal for positive excursions, as well.

Other circuits suitable for detecting and signalling peak amplitude would include the several "track and hold" memory circuits of the Philbrick publication, supra, §§ II.46, through II.48, inclusive, at pages 60 and 61. In a publication entitled "-FAIRCHILD SEMICONDUCTOR LINEAR INTEGRATED CIRCUITS APPLICATIONS HANDBOOK," published in 1967, by Fairchild Semiconductors, and given the Library of Congress Catalog Number 67-27446, a circuit described and illustrated in FIG. 4, at page 136, as well as the nonlinear circuits described at pages 148 and 149, and illustrated in FIGS. 1 through 3, can be used in the present system.

In FIG. 5b there is shown a circuit 120 suitable for providing a voltage output corresponding to and representative of the duration or "pulse width" of a transient. This circuit is derived from the circuit described and illustrated at pages 66 and 67 in the Philbrick publications, supra, at §III.8, FIG. 3.8 (b). The circuit of the publication has been modified in the present example by replacing the illustrated NPN-transistors with PNP-devices 122 and 124, changing the voltage source 126 from negative to positive, and replacing the load Z(1) with a series connected capacitor 128 and diode 130. The output of the circuit is taken from the junction 132 of the capacitor 128 and diode 130. The operation of the circuit 120 is described in the Philbrick publication at pages 66 and 67. Other circuits that would be suitable include the "Pulse Width Discriminator," described at pages 164 and 165, of the Fairchild publication, supra, and illustrated in FIG. 18 of that publication. In the Fairchild circuit, the width of the reference pulse can be set at a nominally small value so that the output substantially represents the width of the transient pulse. The Zero Crossing Detector, described at pages 166, 167 and illustrated in FIG. 3, at page 167, of the Fairchild publication, supra, may also serve as a "duration of pulse" converter.

Turning finally to FIG. 5c, there is shown a circuit 140 suitable for providing a voltage output corresponding to and representative of the "rate of rise" of a transient. The circuit of FIG. 5c, combines a "double-ended limit detector circuit" which is described and illustrated in FIG. 9 at page 170 of the Fairchild publication, supra, with the duration converter 120 of FIG. 5b, supra. To combine the circuits, the output of the circuit of the Fairchild Publication is connected through a suitable base resistor 142 to an NPN-transistor 144 whose collector 146 is connected to the collector of the output transistor 124 of FIG. 5b, above, and whose emitter is connected to common or ground. The circuit would function as described in the Fairchild Publication at page 170.

As an alternative circuit, the Philbrick publication, supra, at pages 94 and 95 in §III.68, described a circuit, illustrated in FIG. 3.68, which might be utilized to measure the "rate of rise." Yet other circuits are known to those skilled in the art and may be employed usefully to mechanize the various "characteristic-to-voltage" converters to quantify the various, significant characteristics of transients.

Turning next to FIG. 6, there is shown, drawn to a common time scale, as FIG. 6A, a series of transient phenomena occurring in a system and detected at a given test point. In FIGS. 6B through 6I, there is shown in the form of bar charts, drawn to a common time scale but relatively skewed to correspond stored data with the transient phenomena represented by the stored data, the typical output of the quantifiers for the significant characteristics of the transients, according to the present invention.

Noting first FIG. 6A, the time axis coordinates have been designated 1-20, each corresponding to a "frame" of the transient analyzer and recording system and will be so identified in the following description. During frame 2, a large positive and negative transient excursion 150 is followed by a smaller positive and negative transient 152. Apparently the transient caused "ringing" phenomena of small amplitude which continued into frame 3. In frame 5, a slot, almost sinusoidal transient 154 occurred which extended through frame 9. In frame 11, a transient "spike" 156 occurred having a large positive portion, relative to the negative portion. In frame 13, a "spike" 158 occurred with a large negative portion. In frame 15, a transient 160 started which, as shown, appeared to be gradually increasing through frame 16, to become, in frame 17 an abrupt positive "spike" which during frame 18 became a negative "spike."

The transients of FIG. 6A, are illustrative only, and are used to show how such transient phenomena would be represented in a transient analyzer according to the present invention.

FIGS. 6B through 6I are graphs of different significant characteristics. FIG. 6B, representing positive maxima, shows, in frame 2, a bar of an amplitude corresponding to the maximum positive amplitude of the transient 150 in frame 2 of FIG. 6. In frames 5, 6 and 7, bars of increasing magnitude illustrate the maximum positive amplitude of the transient 154 during the respective frames. Similarly, frames 11, 13 and 15-17 inclusive, illustrate the representation of the positive maxima of the transients 156, 158, and 160 within the appropriate frames.

FIG. 6C illustrates the magnitude of the negative going portion of the transients. In frame 2, the negative excursion of that transient 150 is illustrated. The transient 154 starting in frame 5, does not have a negative going portion until frames 8 and 9. Similarly, the negative going transients 156, 158 and 160 of FIG. 6A are represented in Frames 11, 13 and 18.

In FIG. 6D, an attempt has been made to represent the "rate of change" of voltage, or "rise time" of the leading edge of the transient. Accordingly, in frame 2, a virtually full-scale rate-of-change is shown. However, the leading edge of the almost sinusoidal transient 154 of frames 5 through 9 may be limited to that portion that occurs in frames 5 and 6. Leading edges of positive-going transients 156, 158 and 160 are also detected in frames 11, 13 and 15-17, inclusive.

The corresponding "leading edges" of the negative going portion of the transients are shown in FIG. 6E. In frame 2, the leading edge of the voltage spike 150 is detected and in frame 7, the leading edge of the negative-going portion of the sinusoidallike transient 154 is found. Further, the substantial "spike" 160 in frame 18 is illustrated by a maximum magnitude signal.

The width or duration of the transients is represented in the graphs of FIGS. 6F and 6G, corresponding to relatively positive and relatively negative transients, respectively. Since the transient 150 of frame 2 lasts for less than a frame time, an appropriate voltage scale is selected for which full scale represents the entire frame time. Lesser voltage magnitide corresponds to a portion only of the frame time. The transient starting in frame 5 extended over several frames, and accordingly full scale values are shown in frames 5 and 6. Less than full scale is shown in frame 7, inasmuch as the transient 154 underwent a negative excursion. Similarly, the width of the positive portions of the transients 156, 158 in frames 11 and 13 are represented, and the transient 160 which started during frame 15 but which extended through frame 17, is illustrated by a roughly halfscale value in frame 15, but full scale values in frames 16 and 17. A corresponding showing is made for the negative going portion of the transients, in FIG. 6G. Obviously, in specialized applications, transients of interest may be of limited duration and accordingly, the scale can be adjusted to show full scale deflection for transients that are only one hundredth of the frame, or less.

In FIGS. 6H and 6I, an attempt has been made in rough and illustrative fashion only, to represent the energy content of the transients or, the integral with time, of the positive and negative voltage excursions, respectively. As will be seen, although the amplitude of the transient 150 in frame 2 was substantial, the duration of the transient was brief, and, accordingly, the integral or energy content of the transient is not great. The longer term transient 154 of frames 5 through 9, while of lesser amplitude, was of greater duration, and therefore contained substantially more energy. In similar fashion, the "-spikes" 156, and 158 of frames 11 and 13 are represented as relatively low-energy transients, while the transient 160 of frames 15 through 18 appears to have both amplitude and duration, and therefore may be considered as having a substantial energy content.

FIG. 7 represents the output that might be recovered from the graphic device such as an output recorder upon the playback of the data stored corresponding to the significant characteristics of the transients of FIG. 6A. FIG. 7 would correspond to the playback of the data quantified, for example, as shown in FIG. 6B. A demodulation of the demultiplexed record tape would produce output voltages corresponding to the maximum positive amplitudes of the transient. The time channel, separately recorded in the tape recorder, could be used to control the horizontal coordinate of the graphic recorder so that the vertical spikes, corresponding to the occurences of the transients, would be properly located, "in time."

In operation, for each "frame" of sampling, "n" or the eight test points are serially "interrogated" and the contents of the quantifiers for each are stored in the buffer/multiplexer 18 during the interval assigned for the read out of that test point information. Each interval is further subdivided into as many subintervals as there are quantifiers for the significant characteristics of the transient.

The buffer/multiplexer 18 then serially modulates the stored information upon a carrier signal which is then either transmitted through a real time link or recorded in a tape recorder. Demodulating and demultiplexing equipment, on the playback end of the system, enables the playback of a single characteristic from a single test point as an individual record. A plurality of individual records can then be prepared, each representing a different significant characteristics from a different test point.

In an alternative embodiment of the invention (not shown), which would of necessity, be more expensive to implement, each of the individual data quantifiers would have associated therewith, a buffer storage element. The multiplexer can then be programmed to store the information thus acquired in any predetermined sequence. If some test points are connected to highly sensitive portions of the system under test, these test points can be monitored and updated more frequently than other test points, enabling even the briefest transients to be monitored with greater accuracy. Further, a more frequent monitoring of certain test points at a higher rate can, without changing the quantifiers, increase the sensitivity of the system, in that "finer" structure of the transients would be analyzed and recorded with less chance of saturating or overloading the quantifiers. Obviously, a part of the system that is virtually insensitive to transients of extremely short duration, may use quantifiers of slower response time in conjunction with less frequent data sampling without resulting in any substantial degradation in system performance.

In summary, the present invention requires high speed, wide band data acquisition equipment only for the vital initial data reduction step. The significant characteristics are quantified by equipment having fast enough response times to extract from a high-speed transient. The signals representing maximum amplitude, duration, "rise time" and energy. For AC systems, the drift of frequency from a predetermined "standard frequency" is significant and if the frequency changes by more than a preset amount, corrective action must be initiated. Further, the rate of change of frequency, or the rate at which the drift is taking place, if in excess of preselected limits, may also be cause for concert.

Once the significant characteristics are obtained and are available as simple, stored signals, the transmission, storage and display of such information can be accomplished using relatively low-speed, low-frequency devices. At the same time, if corrective or other action is necessitated by a transient, the significant characteristics of which have been quantified, the quantifiers can provide signals to initiate the corrective or other action in immediate response to the transient.

What is claimed as new is:

1. A combination for monitoring a system for transient phenomena comprising:
    a. at least one quantifier adapted to be connected to the system to be monitored, said quantifier being a device that is operable in response to transients for generating data signals representative of and corresponding to the magnitude of a selected, significant characteristic of the transient;
    b. data reduction means connected to said quantifier for periodically sampling and storing the data signals therefrom; and
    c. readout means connected to said data reduction means for providing a record of the quantified significant characteristics of the transient, with time,
        whereby information relating to transients is preserved as a series of signals representing the magnitude of significant characteristics of transients rather than recording the transients themselves.

2. The apparatus of claim 1 above, wherein the transient significant characteristic is the peak voltage and said quantifier is operable to generate during each sampling interval a data signal corresponding to and representative of the magnitude of the maximum voltage excursion of the system during that sampling interval.

3. The apparatus of claim 2 above, wherein the transient significant characteristic is the peak positive voltage.

4. The apparatus of claim 1 above, wherein the transient significant characteristic is the duration of the transient and said quantifier is operable to generate during each sampling interval a data signal corresponding to and representative of the magnitude of the maximum duration of a transient during that sampling interval.

5. The apparatus of claim 4 above, wherein the transient significant characteristic is the duration of relatively positive transients.

6. The apparatus of claim 1 above, wherein the transient significant characteristic is the rate of change of voltage with time and wherein said quantifier is operable to generate during each sampling interval a data signal corresponding to and representative of the magnitude of the maximum rate of change of voltage of the system during that sampling interval.

7. The apparatus of claim 6 above, wherein the transient significant characteristic is the rate of change of positive voltage excursions, with time.

8. The apparatus of claim 1 above,
   a. further including a plurality of quantifiers each being operable in response to transients for generating data signals representative of and corresponding to the magnitude of a different significant characteristic of the transients;
   b. said data reduction means further including a corresponding plurality of buffer storage devices each connected to store the data signals of a different quantifier;
   c. means for transferring data signals generated in a first sampling interval to said buffer storage devices for storage therein during a subsequent sampling interval; and
   d. multiplexing means connected to said buffer storage devices for providing a serial signal train of data signals from the different buffer storage devices in a predetermined sequence.

9. Apparatus of claim 8 above, wherein the significant characteristics of transients include the magnitude of voltage excursion, transient duration and rate of change of voltage, with time, and wherein individual quantifiers of said plurality provide data signals corresponding to and representative of the magnitudes of the peak voltage excursion during a sampling interval, the maximum duration of a transient during a sampling interval, and the maximum rate of change of voltage during a sampling interval.

10. Apparatus of claim 9 above, wherein the significant characteristics of transients include the positive and negative voltage excursions of the system, the duration of positive and negative voltage excursions, and the rate of change of voltage for positive and negative voltage excursions, and each of said quantifiers generates a data signal corresponding to and representative of the magnitude of a different one of the significant characteristics.

11. Apparatus of claim 8 above, wherein said data reduction means further include a serial memory connected to said multiplexing means for storing and retrieving serial signal trains of data and said readout means include demultiplexing means connected to receive serial signal trains retrieved from said serial memory for providing a plurality of serial signal trains each corresponding to the data output of a different quantifier.

12. A method of monitoring a system to detect, record and recover information relating to transient phenomena occurring in the system comprising the steps of:
   a. continuously monitoring the system to detect predetermined significant characteristics of transient phenomena;
   b. quantifying the detected significant characteristics as a transient occurs;
   c. periodically sampling the quantified signals to produce data signals corresponding to and representative of the magnitude of the significant characteristics of transients that occurred within the period; and
   d. retrieving the stored data signals to produce a time recording of the magnitude of each significant characteristic as it occurred,
      whereby the actual transient phenomena itself is not stored but rather data signals are stored representing the magnitudes of the predetermined significant characteristics of transients, occuring within each sampling interval.

13. The method of claim 12 further including the steps of:
   a. storing the quantified signals from a first sampling interval while monitoring the system during a subsequent interval, so that information, acquired in a first interval, is quantified during that interval and stored during a subsequent interval as new information is acquired; and
   b. serially storing the data signals in a chronological order for subsequent playback.

14. The method of claim 12,
   a. wherein the monitoring step includes the detection and quantifying of a plurality of significant characteristics;
   b. the storing step includes the multiplexing of the plurality of data signals corresponding to and representative of the several significant characteristics into a single, serial signal trains; and
   c. the retrieving step includes the demultiplexing of the serial signal train to provide a record of each significant characteristic.

15. The method of claim 12, wherein the monitoring step includes the detection and quantifying of the magnitude of the maximum voltage excursion during each sampling interval, whereby a record is provided of positive voltage peaks for each of the sampling intervals.

16. The method of claim 12, wherein the monitoring step includes the detection and quantifying of the magnitude of the maximum positive and negative voltage excursions during each sampling interval, whereby a record is provided of positive and negative voltage peaks for each of the sampling intervals.

17. The method of claim 12, wherein the monitoring step includes the detection and quantifying of the magnitude of the duration of any voltage excursion during each sampling interval, whereby a record is provided of the duration of voltage excursions for each the sampling intervals.

18. The method of claim 12, wherein the monitoring step includes the detection and quantifying of the magnitude of the duration of the positive and negative voltage excursions during each sampling interval, whereby a record is provided of the duration of positive and negative voltage excursions for each of the sampling intervals.

19. The method of claim 12, wherein the monitoring step includes the detection and quantifying of the magnitude of the maximum rate of change of voltage with time during each sampling interval, whereby a record is provided of the rate of change of voltage for each of the sampling intervals.

20. The method of claim 12, wherein the monitoring step includes the detection and quantifying of the magnitude of the maximum rate of change with time of positive and negative voltage excursions during each sampling interval, whereby a record is provided of the rate of change of voltage for each of the sampling intervals.

21. An apparatus for detecting, quantifying, storing and reproducing selected parameters of transient phenomena, the combination comprising:
   a. a plurality of quantifying detectors connected in parallel to a system to be monitored, each detector being a device that is operable to provide a data signal, corresponding to an representative of the magnitude of a different significant characteristic parameter of a transient phenomena;
   b. a corresponding plurality of storage elements, each connected to a different one of said plurality of detectors, for staticizing and holding the data signal therefrom;
   c. signal transmission means coupled to all of the storage elements for selectively transmitting data signals stored therein, in a predetermined, cyclical order;
   d. signal receiving means, connected to receive transmitted signals for recovering from said transmitted signals, a plurality of serial signal trains, each respectively corresponding to the output of a different detector and storage element combination; and e. display means, connected to said signal receiving means and selectively operable in response to each applied one of the plurality of signal trains for generating an output corresponding to and representative of the transient phenomena characteristic detected, quantified and stored in the associated detector and storage element.

* * * * *